Patented Sept. 23, 1952

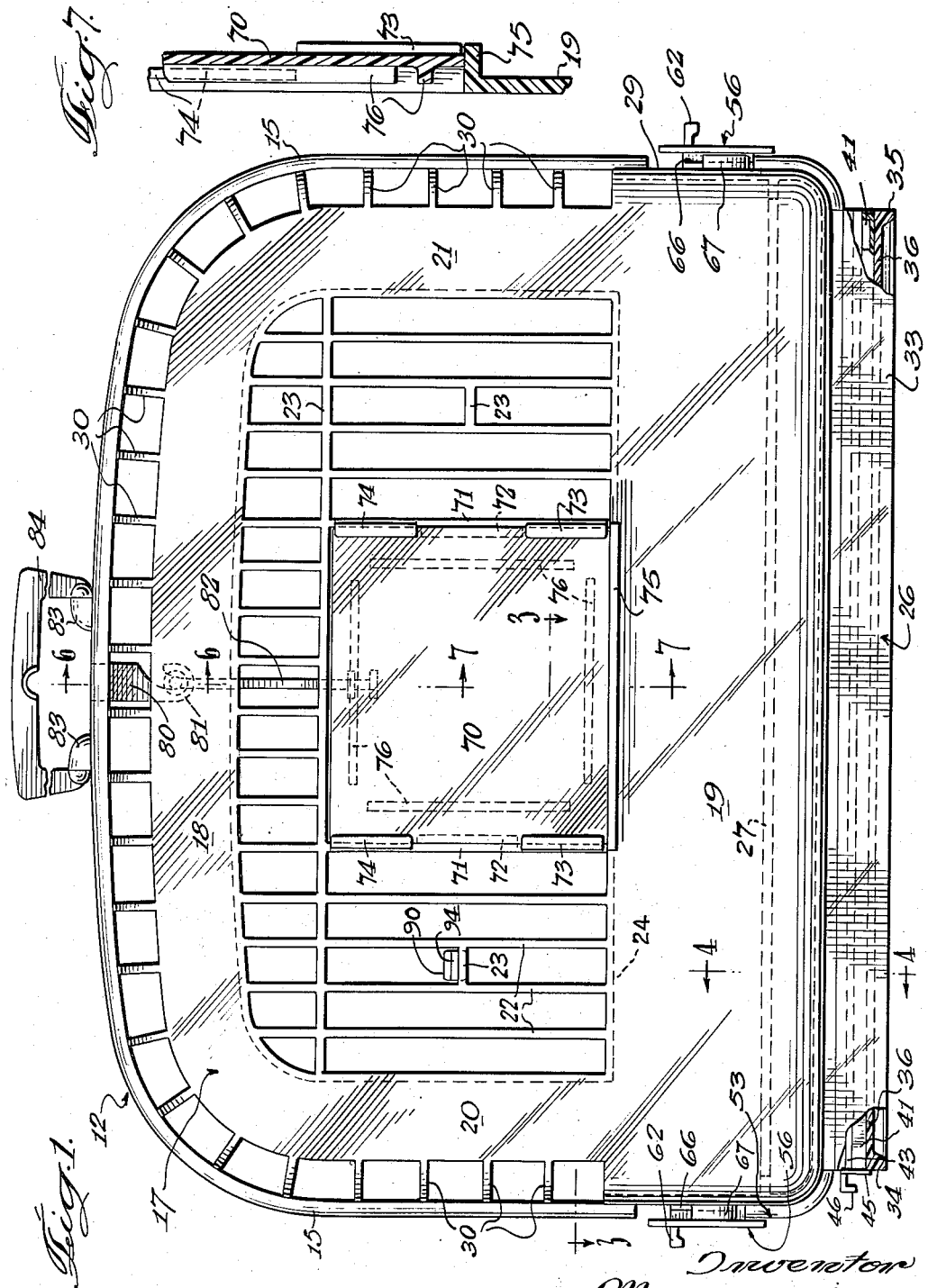

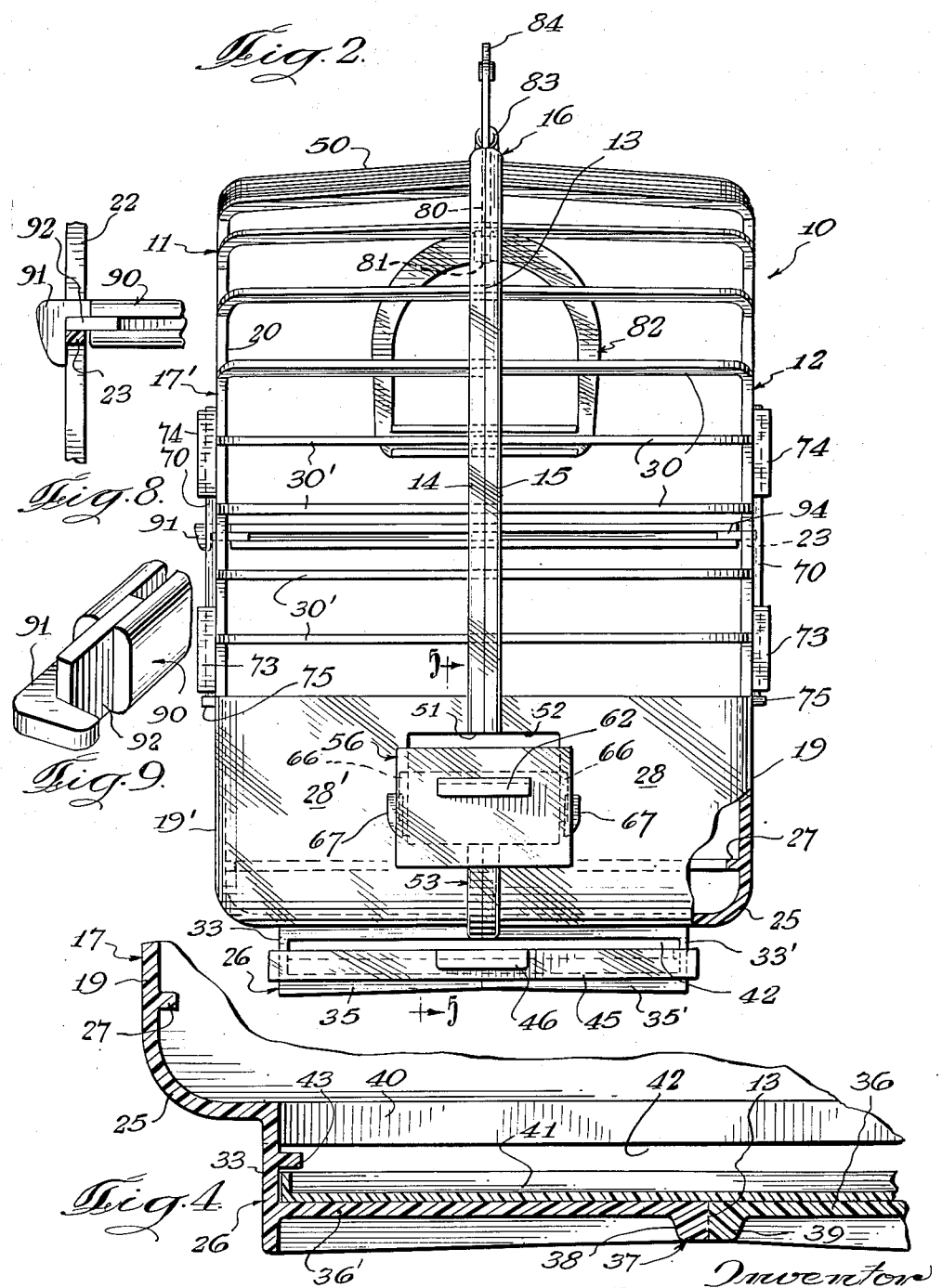

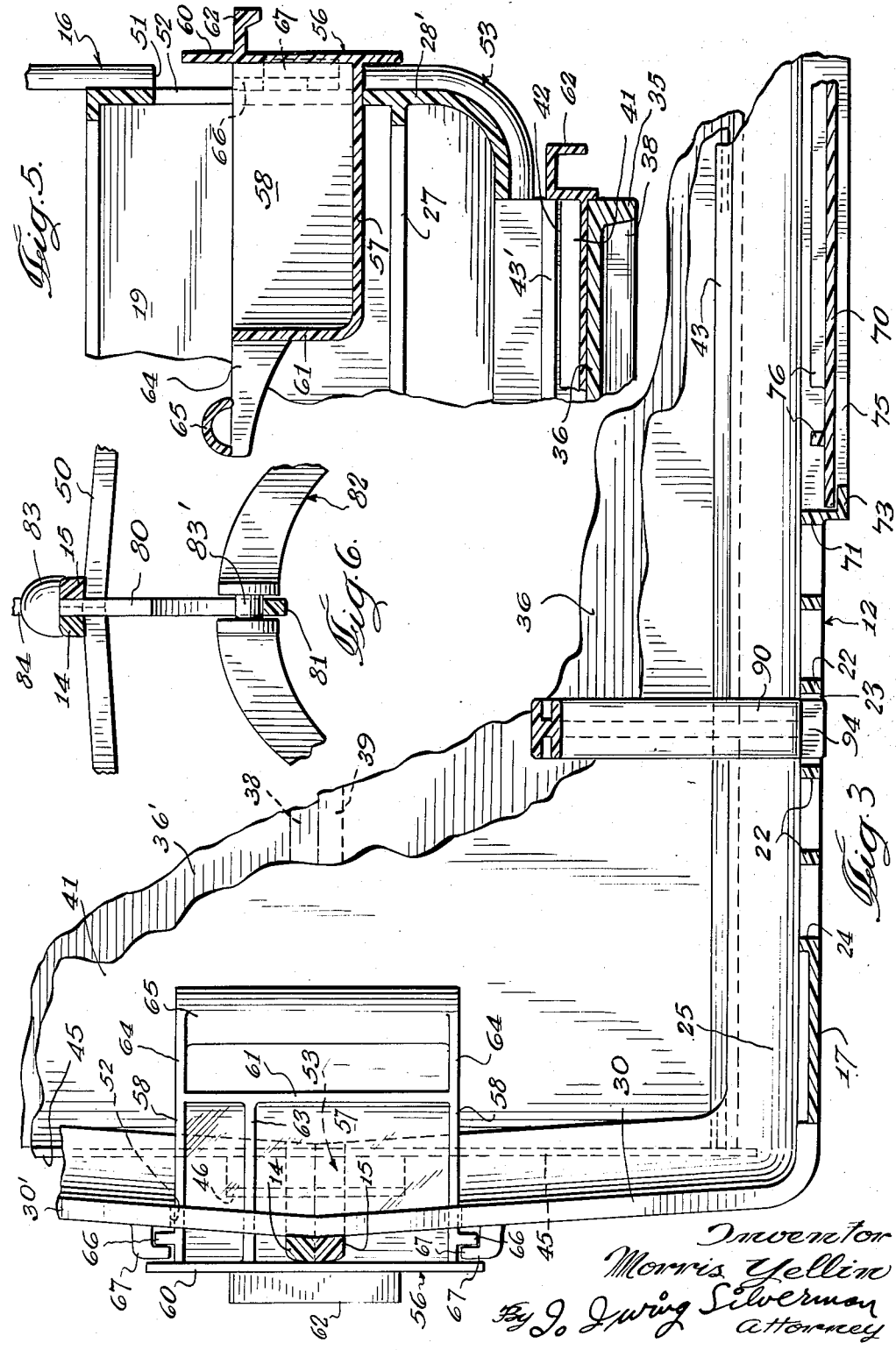

2,611,338

UNITED STATES PATENT OFFICE 2,611,338

PLASTIC BIRD CAGE

Morris Yellin, Chicago, Ill., assignor to Bernard Edward Co., Chicago, Ill., a corporation of Illinois Application June 29, 1951, Serial No. 234,181

7 Claims. (Cl. 119—17)

This invention relates generally to bird cages and more particularly is concerned with the construction of a bird cage which is plastic, that is to say, one which is made from a thermoplastic resin, and preferably a thermoplastic resin which is transparent.

Heretofore cages for birds or other small animals have been constructed of metal, usually brass or steel, although a few have been made either wholly or partially from plastic materials. Such cages with which I am concerned are the ornamental type which are maintained in the home for the purpose of housing a pet. Under these circumstances the cage is formed with the maximum of lattice-work or bars so that the pet can be seen as much as possible. The members serving as restraining means are as thin as possible and only the barest connection therebetween is desired.

Metal lends itself readily to such requirements; but of course metal is not transparent. Those parts which of necessity must be continuous, such as for example side panels and the like, shut off the animal from the view of the observer, and by the same token shut off the observer from the animal. Attempts to substitute glass for such parts require expensive fittings and likewise render the cage heavy and likely to be broken.

I have determined that a bird cage advantageously can be constructed of materials commonly known as thermoplastic resins, in common use today in other industries and fields. In order to use plastic materials in the construction of a cage, certain apparently insurmountable problems arose, but were solved as presently will be pointed out.

A further factor to be considered in the construction of bird cages is that when a nation is undergoing a period of stress, such as a national emergency in the case of war, materials must be substituted for metal wherever possible, and one of the first items that is curtailed is bird cages. In previous national emergencies it had been found necessary to discontinue the production of bird cages because no solution to the problems of producing bird cages from plastic materials could be found.

The principal object of this invention is to provide a bird cage which is formed completely of thermoplastic materials.

Still another object of the invention is to provide a plastic bird cage which is transparent.

Another object of the invention is to provide a bird cage construction in which the problems arising in producing same from a thermoplastic material are solved.

In connection with the last mentioned object it is desired to point out that the plastic bird cage must be made by using injection molds. The members formed in the molds are drawn from the molds by movement in a single direction. There cannot be any substantial undercuts, and if the cage is to be comparable with metal cages, the members forming the same must be thin and properly shaped. Obviously no ordinary method of producing plastic articles is capable of being used. No fastening members are practical, because they will be seen and render the cage unsightly. The cage must be substantially symmetrical in order to provide an ornamental and pleasing appearance.

Additional objects of the invention lie in the provision of a bird cage which meets all of the requirements set forth above.

Another object of the invention is to provide a bird cage which is formed of similar parts joined along a novel facing rib, each of the parts being provided with part of such rib, the rib providing a good surface for bonding the parts together.

Still a further object of the invention is to provide a plastic bird cage which is completely transparent so that the animal therein can be seen from all sides and the top and the bottom, if desired, and to provide in addition a construction making this possible.

Another object of the invention is the provision of a novel bird cage having a panel arrangement which, although suitable for ornamentation, serves to provide support for fine ribs or bars of said cage.

It is another object of the invention to provide a bird cage which may be easily washed like any dish and which may be placed in a container of water with any detergent and thereby cleaned.

In connection with this object, one disadvantage of metal bird cages is that they are difficult to wash and, of course, have parts which may corrode. Furthermore, minute amounts of dirt and other particles are liable to collect in the sharp corners of bird cages and such dirt is an ideal breeding place for bird lice and nits. With a plastic bird cage which may be cleaned as stated above, any dirt which may have collected is readily discernible and may be definitely removed.

Many other objects will occur to those skilled in the art, and many advantages will become apparent as the description proceeds. A preferred embodiment has been illustrated, not by way of limitation, but merely to enable a better and more complete understanding of the invention.

In the drawings:

Fig. 1 is a side elevational view of a bird cage constructed in accordance with my invention with parts being cut away to show certain constructional details.

Fig. 2 is an end-on elevational view of the bird cage, with certain parts cut away and others in section.

Fig. 3 is a fragmentary sectional view taken generally along the line 3—3 of Fig. 1 and in the indicated direction.

Fig. 4 is a fragmentary sectional view taken generally through the bird cage along the line 4—4 of Fig. 1 and in the direction indicated.

Fig. 5 is a sectional view taken through the side wall of the bird cage along the line 5—5 of Fig. 2 and in the indicated direction showing the construction of a feed trough.

Fig. 6 is a sectional view taken generally along the line 6—6 of Fig. 1 and in the indicated direction to show the construction of a swinging perch.

Fig. 7 is a sectional view taken generally along the line 7—7 of Fig. 1 and in the indicated direction.

Fig. 8 is a sectional view of a detail of construction of the fixed perch.

Fig. 9 is a perspective view of the end of the fixed perch.

At the outset it is believed advisable and desirable to point out what is believed to be the essence of the invention, such that thereby the construction of a plastic and, if desired, transparent bird cage has been made possible. The principal constructional features of the invention are the provision of an unobtrusive rib around the entire cage which, while providing some measure of ornamentality, principally provides the strength for supporting the bar members of the cage and the cementable surfaces to enable two halves of the particular bird cage shown intimately and durably to be bonded together; and the provision of border panels on the sides of the bird cage, which also provide a form of ornamentality if desired, but principally provide a base for the ends of the bar members. Thus the bar members extend along the top and end, between the ribs and the border panels. The bottom of the cage is imperforate, but also provided with the rib, or a continuation thereof, serving on the bottom in a functional capacity.

Referring now to the drawings, the bird cage is designated generally 10. The cage is formed of two similar halves 11 and 12 each formed substantially in the same manner, i. e., by injection molding of thermoplastic material, such as styrene or methyl methacrylate resin, preferably transparent. The two halves are joined together along a juncture 13 formed in a manner to be described, for example by juxtaposing and cementing together the halves 14 and 15 of a rib 16 which extends substantially about the entire cage.

The cage is thus provided with sides, ends and top and bottom. That cage illustrated is generally rectangular in horizontal cross section with a somewhat arched domelike upper part, but it is desired to emphasize that the exact shape of the bird cage is of no importance except insofar as it provides the essential structural elements called for by the appended claims.

The side illustrated in Fig. 1 is substantially the same as the opposite side which is not seen. It is formed on the half 12 and will be the part which comes out of the mold last, in the manner well known among those skilled in the molding art. It is designated generally 17 and provided with top, bottom, and end panel borders 18, 19, 20, and 21, respectively, all being formed integrally and being continuous about the side 17. In the open space formed inside of the panel border described, there may be a lattice-work of bar members, running vertically as at 22 and horizontally as at 23. Obviously any kind of grille would be suitable. The entire side 17 could be imperforate in the case of transparent bird cage without materially affecting the view of the observer, but in the interests of air and having the cage as open as possible, such lattice-work is preferred.

I have found it desirable that there be a strengthening rib 24 formed about the inside of the border panel so that the ends of the bar members 22 and 23 are secured at points having a sufficiency of anchoring material. In this manner also, the panel borders can be formed of extremely thin material, while the bar members can be slightly thicker for strength.

The bottom panel 19 is imperforate as shown, and curves around the bottom corner of the cage as shown at 25, terminating at the pedestal or base 26 which will be described. There is an internal strengthening rib 27 about the inside of the panel 19 also for strength and this rib follows the entire inside of the bird cage 10. It will be noted that the lower panel 19 is continued imperforate about the entire bottom of the bird cage also, and hence there is an end panel portion 28 as seen in Fig. 2, and another 29 at the opposite end. Obviously, since the second half 11 of the cage is substantially identical, this construction is also present. There are provided end panels, only 28' of which is visible in the drawings, which are extensions of the lower panel 19'. The remainder of the left side 17' need not be described since it duplicates side 17.

From the upper and end edges of the border panels 18, 20, and 21, there are arched bars 30 which are integrally formed with said panels and extend transversely of the cage half 12, i. e., right and left as viewed in Fig. 2. These bars are connected at their outside ends to the border panels, and at their inner ends to the rib 15. It will be seen, therefore that the bars 30 are fully supported from both ends thereof, and by virtue of their arched arrangement, may be quite rigid and strong.

Identical bars 30' are formed on the opposite half 11 of the bird cage, extending between the border panels and the half rib 14.

Calling attention to Fig. 4, and the pedestal 26 formed on the bottom of the bird cage 10, there are four walls vertically arranged and formed integral with the lower portions of the respective halves of the cage. In other words, one side wall 33, a half end wall 34, and a second half end wall 35 are all formed from the half 12, while the corresponding half walls and side wall, designated with primed characters, are formed from the other half. The bottom of the pedestal 26 may be recessed, thereby forming a bottom wall for the pedestal made up of halves 36 and 36'. It will be seen that the bottom wall halves are also provided with halves of a rib 37 which is a continuation of the rib 16, extending the entire length of the bottom wall. The halves 38 and 39 are integrally formed with the bottom wall halves 36 and 36', provide great structural strength, and a broad bonding surface to enable the formation of the juncture 13 on the bottom of the bird cage.

The bird cage interior is open to the pedestal 26 as indicated by the well 40 so that the bird cage may be kept clean merely by removing from the pedestal a shallow drawer 41 carried therein. The front end wall of the pedestal is slotted as shown at 42 in Fig. 2 and Fig. 5. There is an elongate rib 43 spaced above the bottom wall 36 to form a groove for the drawer 41, and a similar rib 43' on the opposite side forming a companion groove. The drawer 41 has a front panel 45 and a handle 46 which enable the drawer readily to be removed. Obviously, the drawer 41 is formed in a different die from those forming the cage halves, and by any conventional molding or forming operation.

The recesses formed in the bottom of pedestal 26, although in the nature of undercuts, are readily formed during molding by "pull-outs," i. e., portions of the die which automatically move outwardly when desired after the injection process has been completed. This technique is well-known in the molding art, and is easily adapted for use where an indentation opens to the outside of the molded article.

As in all molding operations, draft is required to enable removal of the article from the mold. Hence each of the halves 11 and 12 is drafted with the high parts being in the center. The smaller dimension is the outside, the larger dimension the inside. Thus the draft is as exaggeratedly shown at 50 in Fig. 2, for example. The lines of the cage are shown to slope upward toward the rib 16 at this point. In like manner, draft is shown in a top view, Fig. 3, the ridge being the central rib.

The ends of the cage are each provided with a food or water drawer, the construction of which is best seen in Figs. 3 and 5. Since both drawers are alike identical characters of reference are applied to the same parts of each. Note that the rib 16 discontinues at 51 at which point there is a rectangular window 52 formed in the wall 28, 28'. The rib continues below the window and there is a section curved around the lower panel border terminating at the pedestal 26 and designated 53. The drawer 56 consists of a bottom wall 57, side walls 58, a front panel 60, and a rear wall 61. There is a handle 62 on the front panel to enable manipulation of the drawer, and the panel is larger than the width of the window 52 to prevent the drawer from being inserted too far into the cage. A partition 63 may be provided to form separated compartments. Note that the walls 58 and 59 have extensions 64 which have a curved perch 65 secured therebetween and integral therewith. Each of the drawers has a vertical flange 66 rearwardly spaced from the panel 60 and adapted to enter grooves formed in the integral brackets 67 provided on each half of the cage arranged parallel with the vertical edges of the windows 52. The drawer 56 is thus inserted into the window 52 above the brackets (the window is made large enough to permit this) and the flanges 66 inserted into the grooved brackets, and the entire drawer slided downward. The drawer is thus securely held and provides a permanent perch for the bird while feeding from the drawer.

As explained, two such drawers 56 are provided, although obviously either or both may be eliminated without affecting the principal constructional features of the cage as described.

The side walls 17 and 17' each may be provided with a removable center plate section 70 which is shown in Figs. 1 and 7. Two of the vertical bars designated 71 have outwardly extending portions provided with facing flanges 73 and 74. There is thus formed a channel to permit the rectangular plate section 70 to slide therein vertically. Note that the flanges have upper and lower portions and there is a rearwardly spaced similar flange 72 to complete the formation of the channel and prevent the plate from falling into the cage. Obviously there is no lattice-work at this point, to give access to the cage when the plate is removed. There is a horizontal ledge 75 projecting outward from the top edge of the border panel 19, upon which the plate 70 rests. The plate is rigidified by horizontal and vertical ribs indicated at 76.

From the top of the cage there is a hook member 80 secured to the rib 16 and extending inside the cage. For example, there may be a recess left in the rib halves at this point to permit the hook member to be cemented in place. The bottom of the hook member 80 has a hook portion 81 and a stirrup-shaped perch 82 having a trunnion 83' at the top thereof is removably and swingably hung from said hook portion. A pair of brackets 83 are formed on the rib 16, having sockets for receiving therein the pintles of a swingable handle 84. Obviously this construction is optional and need not be shown in great detail. A fixed handle could just as well as used.

I have devised a simply constructed and easily made fixed perch for the bird cage which is designated generally at 90, and details being shown in Figs. 8 and 9. The body is an elongate member having an H shaped cross section. There is provided a hook shaped tongue 91 at one end and a perpendicular portion 92 inside the hook and at right angles to the member forming the hook. This is best shown in Fig. 9. It is intended that the hook extend outside of the cage and outside of a horizontal bar such as at 23 with the portion 92 overlying the said bar as shown in Fig. 8. This locks the perch 90 in place. The opposite end of the perch need only have a portion 94 similar to portion 92 resting upon the horizontal bar 23 directly opposite. This is best seen in Fig. 2.

From the above description it is seen that the entire cage may be formed of plastic by molding same in an injection mold. Such parts as the drawers, perches, handle, and side plates 70 are fabricated separately, and then assembled to the cage. The cage body is formed with the same mechanical design technique as metal cages, that is, the members comprising the bars are very thin and the lattice-work is quite open. There are no unsightly fastening members, and many advantages over metal cages are achieved. The cage is light, strong, and when made of transparent plastic there is much greater visibility than any metal cage.

Although it is understood that dimensions are of no importance insofar as the invention is concerned, it is desired to point out that an ordinary bird cage is intended to occupy the volume of about a cubic foot. To form such a large structure from injection molded plastic, so far as I am aware, has never been successfully accomplished at low cost because of the problems alluded to herein. It is only by providing the rib 16 that extends substantially about the entire cage and to which one end of all of the transverse bars are anchored and the lower border panels and the bottom pedestal wall are secured that I have successfully been able to make such a structure at low cost. This rib besides providing the necessary strength for the lattice-work provides a broad cementing or other bonding surface on the contiguous surfaces of its halves. The best views of the juncture 13 are in section in Figs. 3 and 4. In every case the rib halves are integral with the members that are joined thereto. In addition, the provision of the border panels for securement of the opposite ends of the bars has been instrumental in enabling the bird cage to be a practical article.

It is believed that the invention has been fully described and should be understood without further discussion. Many details in the construction and formation of the parts and in the dimensions and shape are possible without departing from the spirit or scope of the invention as defined in the appended claims.

I claim:

1. A bird cage comprising a top and sides integrally connected therewith, lower portions of said sides defining a cage opening for receiving bird droppings, at least one medial rib extending completely along said top and sides and lying in a vertical plane, and cage forming portions extending laterally from both sides of said medial rib and at least partially defining the top and sides of said cage, each medial rib being relatively heavy compared with said laterally extending portions and defining two half-rib sections formed integrally with their adjacent laterally extending portions, whereby the cage may be cast in a plurality of sections and brought together to be integrally joined to form the bird cage.

2. A bird cage formed of molded material comprising a top and sides integrally connected therewith, lower portions of said sides defining a cage opening for receiving bird droppings, a medial rib extending completely along said top and sides and lying in a vertical plane, and a plurality of bars extending laterally from both sides of the medial rib and at least partially defining the sides of said cage, said medial rib being defined by a pair of joined together juxtaposed half-ribs each formed integrally with its adjacent lateral bars, whereby the cage may be cast into two half-sections and brought together to be integrally joined to form the bird cage.

3. A bird cage formed of molded material comprising a top and sides integrally connected therewith, lower portions of said sides defining a cage opening for receiving bird droppings, at least one medial rib extending completely along said top and sides and lying in a vertical plane, a plurality of bars extending laterally from both sides of said medial rib and at least partially defining the sides of said cage, said medial rib being defined by two half-rib sections formed integrally with their adjacent lateral bars, whereby the cage may be cast in a plurality of sections and brought together to be integrally joined to form the bird cage, and a removable floor member at the bottom of said cage positioned across said cage opening.

4. A bird cage formed of molded material comprising a top and sides integrally connected therewith, lower portions of said sides defining a cage opening for receiving bird droppings, at least one medial rib extending completely along said top and sides and lying in a vertical plane, and a plurality of bars extending laterally from both sides of said medial rib and at least partially defining the sides of said cage, each medial rib being defined by a pair of joined together juxtaposed half-rib sections each formed integrally with its adjacent lateral bars, whereby the cage may be cast in a plurality of sections and brought together to be integrally joined to form the bird cage, and the lower portions of said sides above said cage opening being substantially solid and extending continuously around the sides of said bird cage and terminating at said half-ribs.

5. A bird cage formed of molded material comprising a top and sides integrally connected therewith, lower portions of said sides defining a cage opening for receiving bird droppings, at least one medial rib extending completely along said top and sides and lying in a vertical plane, a plurality of bars extending laterally from both sides of said medial rib and at least partially defining the sides of said cage, each medial rib being defined by a pair of joined together juxtaposed half-rib sections each formed integrally with its adjacent lateral bars, whereby the cage may be cast in a plurality of sections and brought together to be integrally joined to form the bird cage, the lower portions of said sides above said cage opening being substantially solid and extending continuously around the sides of said bird cage and terminating at said half-ribs, an aperture formed in said solid portion of the sides, and a food drawer slidably positioned in said aperture and extending within said bird cage.

6. A bird cage formed of molded material comprising a top and pairs of sides and ends integrally connected therewith, lower portions of the sides and ends defining a cage opening for receiving bird droppings, a medial rib extending completely around said cage and lying in a vertical plane passing through said top and pair of ends, said pair of sides being substantially imperforate, a plurality of bars extending laterally from both sides of said medial rib and terminating at said imperforate sides and at least partially defining the ends of said cage, said medial rib being defined by a pair of joined together juxtaposed half-rib sections each formed integrally with its adjacent lateral bars, whereby the cage may be cast in a plurality of sections and brought together to be integrally joined to form the bird cage, said substantially imperforate sides having lattice work formed substantially centrally therein, at least one side having an enlarged opening centrally of said lattice work, and a removable door for covering said enlarged opening.

7. A bird cage formed of molded material comprising a top and pairs of sides and ends integrally connected therewith, lower portions of the sides and ends defining a cage opening for receiving bird droppings, a medial rib extending completely around said cage and lying in a vertical plane passing through said top and pair of ends, said pair of sides each having a relatively broad imperforate band bordering the same, and a plurality of bars extending laterally from both sides of said medial rib and terminating at the edges of said border bands, said plurality of bars at least partially defining the ends of said cage, and the lower portions of said sides and ends above said cage opening being substantially imperforate and extending continuously around the sides of said bird cage and terminating at said half-ribs, said medial rib being defined by a pair of joined together juxtaposed half-rib sections each formed integrally with its adjacent lateral bars, whereby the cage may be cast in a plurality of sections brought together and integrally joined to form the bird cage.

MORRIS YELLIN.

(References on following page)

REFERENCES CITED

The following references are of record in the file of this patent:

UNITED STATES PATENTS

| Number | Name | Date |
|---|---|---|
| 1,545,671 | Lindemann | July 14, 1925 |
| 1,662,687 | Tullis | Mar. 13, 1928 |
| 1,745,879 | Tullis | Feb. 4, 1930 |
| 1,753,674 | Tullis | Apr. 8, 1930 |
| 1,779,864 | Tullis | Oct. 28, 1930 |
| 2,120,262 | Rodess | June 14, 1938 |
| 2,190,119 | Hoefler | Feb. 13, 1940 |
| 2,240,631 | Stewart | May 6, 1941 |
| 2,241,259 | Hanson | May 6, 1941 |

FOREIGN PATENTS

| Number | Country | Date |
|---|---|---|
| 326,559 | Italy | June 3, 1935 |

OTHER REFERENCES

Science Illustrated, November 1946, page 85.
Popular Mechanics, March 1947, page 170.